Dec. 8, 1959 R. T. NIESET 2,916,622

METHODS AND APPARATUS FOR COPYING

Filed Dec. 28, 1956 2 Sheets-Sheet 1

INVENTOR

ROBERT T. NIESET

BY Cushman, Darby & Cushman

ATTORNEYS

Dec. 8, 1959 R. T. NIESET 2,916,622

METHODS AND APPARATUS FOR COPYING

Filed Dec. 28, 1956 2 Sheets-Sheet 2

INVENTOR
ROBERT T. NIESET

BY Cushman, Darby & Cushman

ATTORNEYS 2,916,622

METHODS AND APPARATUS FOR COPYING

Robert T. Nieset, New Orleans, La., assignor to Kalvar Corporation, New Orleans, La., a corporation of Louisiana Application December 28, 1956, Serial No. 631,260

2 Claims. (Cl. 250—65)

This invention relates to methods and apparatus for making copies of originals by inter alia irradiating an original with radiation to which different areas of the original react differently.

It has been previously described that if a graphic original having some areas of one radiation absorbing characteristic and other areas of another radiation absorbing characteristic is irradiated, the radiation is differently absorbed by said respective areas of the original and a visible change in copy material laid against the original can be achieved. The change is in those areas conforming to the areas of greater radiation absorption in the original. As an example, the original may be a black-on-white printed or typed page, irradiated with infra-reds.

The primary object of the present invention is to provide steps and means for regulating the characteristics of said irradiating radiation to obtain excellent useful change of whatever type it may be, in those areas of copy material conforming to the areas of greater radiation absorption in the graphic original, while still preventing degradation of those areas of the copy material which are not in proximity to the areas of greater radiation absorption of the original, and therefore are not intended to undergo the useful change, or any change.

Other objects and the entire scope of the invention will become apparent from the following more detailed description, and from the appended claims.

Various inventive features can be best understood with reference to the accompanying drawings which show illustrative embodiments.

Figure 10:
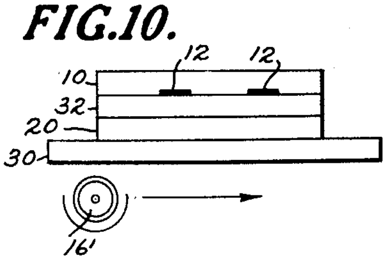
Figure 11:
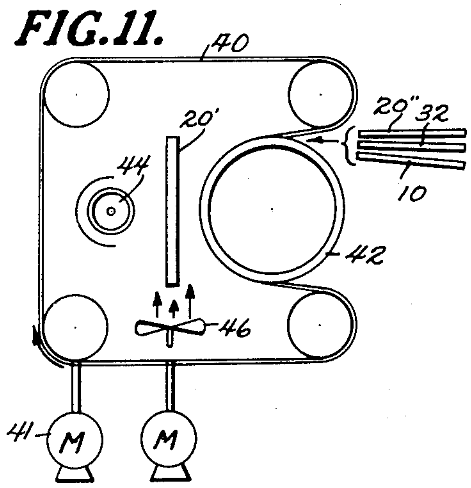

Figure 10 diagrammatically shows one form of apparatus for practice of the invention, and Figure 11 diagrammatically shows another form of apparatus for use according to the invention.

In the figures the thickness of original, copy and filter materials is variously exaggerated for convenience in explaining the invention.

Figure 1:
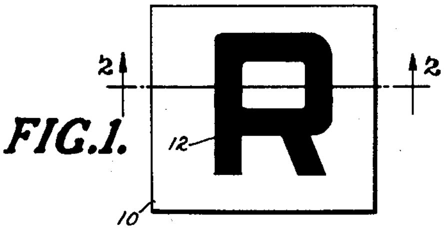
Figure 1 shows a representative graphic original.

As indicated above, it is known that if a graphic original, for example, a sheet of white paper 10 as shown in Figure 1 having a character 12 thereon which is darker, say black, is irradiated by a given radiation, say infra-red radiation, the areas within the confines of the character 12 will absorb more of this radiation than the background. To the extent of the differential absorption, those areas which have greater absorption will experience certain phenomena. One is that the more absorptive areas will increase in temperature more than less absorptive areas. Strong radiation with infra-reds will create particularly useful heat differential between the character areas and the background areas. For example, a tungsten filament type infra-red bulb of 500 watts normal rating operated at 700 to 900 watts maintained from two to four inches from a black-on-white-printed surface for time periods of a few seconds will create temperatures in the black areas of for example 100° C. Meanwhile, but apparently in dependence upon irradiating wavelengths, the white areas will not increase in temperature as much as the black areas. The dark areas need not be black, nor the background white, but variance in the respective absorptive properties alters the result, normally to decrease the differential.

Exemplary of copy materials which undergo a change when associated with a graphic original thusly irradiated and use of which is vastly improved by the present invention are those thermographic ones which undergo a visible change when subjected to conducted heat. This line of materials is described in Miller Patents 2,663,654, 2,663,655, 2,663,656 and 2,663,657. See also Clark et al. 2,710,263. A typical example of this material is given in Patent 2,663,654 beginning at column 3, line 35, and such example is to be considered as incorporated herein, as well as the various other examples of these patents.

Figure 2:
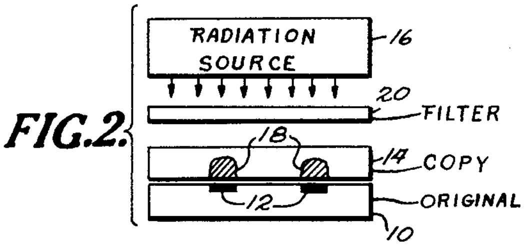
Figure 2 shows a cross-section of the graphic original of Figure 1 along line 2—2 thereof, and further aspects of the invention.

As shown in Figure 2, which is a cross-section of Figure 1 along line 2—2, if a sheet of copy material 14 of one of the types described in the above noted Miller patents (e.g., that described in Example 1 of 2,663,654), is placed in heat conductive contact with the graphic original 10, and this two-ply combination is irradiated by radiation from radiation source 16, the radiation will be more absorbed in the areas 12 than in the background. Therefore, these areas will heat up more than the background areas, and visible change, as indicated by reference character 18, will occur in conformity with the areas 12. The copy material 14 may then be peeled away and serves a useful purpose.

Systems of reproduction as just described suffer a serious disadvantage, as follows: The knowledge and practice of the art before the present invention is to cause the radiation source 16 to radiate strongly over a considerable spectral range, preferably the infra-reds. The latter may be taken as extending generally from the visible reds up through ten microns wavelength. However, particularly during continued use of apparatus which has beed described (see Miller Patents 2,740,895 and 2,740,-896 in addition to those above cited) and placed on the market under the trademark Thermofax, serious degradation of the copy material occurs. This is particularly so when using materials sold by the assignee of the aforecited patents under the trademark Thermofax, whether or not these materials be squarely within any one or more of the above patents. It appears to me that this progressive degradation is due (1) to the infra-red radiation acting directly upon the copy material to cause visible change overall, (2) to the radiation acting upon the original in such manner as to fail to produce usable heat differential, or (3) to both, or for perhaps other reasons. In any event, instead of the visible change just occurring in proximity to the more absorptive areas 12, change occurs over all of the copy. For one thing, it is believed that the copy material, contrary allegations notwithstanding, is not entirely transparent to all wavelengths of the irradiating radiation. Instead, parts of the radiation may be absorbed, and undesired visible change in the material results. Additionally, radiations at least of some wavelengths, may so heat up even the lighter areas of the original so as to cause change in the copy.

Where spectral ranges other than infra-reds are used, it is my experience that so much power has to be introduced to cause the required heating, that the copy material is degraded overall for the same reasons, unless the present invention is relied upon.

It is my discovery, in accordance with the main objective of this invention, that the radiations employed for causing differential action in the graphic original should be regulated as to ranges of wavelengths to have fairly substantial reduction in strength in preselected spectral ranges so that good differential action in the graphic original material will be achieved, and without degradation of the copy material in those areas apart from the darkened areas of the original whereat useful change is to occur.

To first take an exemplary case, one based on operation in the infra-red range is selected. Practice has shown that the most desirable operation is in this range. Here I have discovered that one or both of at least two factors are involved. First, some ranges of infra-red wavelengths create food differential heating in the graphic original material, while other ranges do not. Generally speaking, relatively longer wavelengths, say above about six microns to take an example, while heating up the darker or more absorptive areas of the original to a considerable extent, also tend to heat up the remaining areas almost to the same extent. At least, the differential between the respective areas may become so small, a matter of only a few degrees C., that even with materials which sharply trigger to give visible change, the situation cannot be sufficiently controlled to avoid degradation of the copy. However, if some type of regulation is performed upon the radiations so that these longer wavelengths are prevented from acting upon the original, and only shorter wavelengths which do produce usable heat differentials are permitted to reach the original, degradation is avoided.

The other factor is that the copy material itself may be so absorptive of some ranges of radiation that degradation occurs directly, without regard to the original material. Here again, I have found that the relatively longer wavelengths, for example about six microns, may in some cases more seriously attack the copy material directly, than relatively shorter wavelengths.

Turning now to the general case, my discovery is that attention is to be paid to the ranges of wavelength of irradiating radiation which produce the best or greatest heat differential between differing areas of the original material. Secondly, or in combination with the factor just mentioned, consideration is to be given to ranges of radiation to which the copy material is directly responsive. Upon determination of respective ranges which afford desirable and undesirable reactions, the radiation should be regulated to apply the wavelength ranges which give desirable results, and to suppress the others.

I have found it most preferable and practical to arrive at a radiation regulation discriminating against certain wavelength ranges, and screen these jointly from the original and the copy material. However, it will be understood that even if the regulation prevents certain radiations from reaching the original while permitting same to reach the copy material, or vice versa, the operation is still within the present invention. There may even be different radiation regulation for radiations otherwise available to the original material on the one hand, or to the copy material on the other.

Turning again to operation in the infra-red range, one excellent mode for carrying out my invention is as follows: Here I have discovered that with the type of conductive-heat responsive materials described by the aforenoted Miller patents or sold by the assignee thereof as examples, the source of radiation should be controlled, as by its characteristics per se, if possible, or by the use of a material between the source 16 and the copy material 14, so that infra-red radiation around five to six microns wavelength and longer should be prevented from reaching the copy material overall and the original overall in any appreciable strength, while wavelengths up to at least about four to five microns should come through strongly. I have discovered that if such regulation of infra-reds in this general region of the spectrum is achieved, very excellent differential action in the graphic original is achieved, with corresponding excellent visible change 18 in the copy material, but without degradation of the remaining areas of the copy material which are to remain in original form. Of course, as stated above, it should be understood that for any type of material, the invention embraces the general concept of so regulating the radiation which can reach at least one of the original and copy materials as to prevent degradation in the areas of the copy intended to remain unchanged, while still achieving the best differential absorption characteristics in a graphic original, and therefore the best useful change in the desired areas of the copy material.

I have found that in practice it is difficult to control the wavelengths of radiation from a radiation source per se to achieve a desirably sharp cut-off. Use of an ordinary source which only reaches around two and one-half microns (see Miller 2,740,896) is no solution, because there is only such a gradual increase in power versus wavelength going toward shorter wavelengths, that power requirements still cause the undesirable degradation. However, I have discovered that excellent results can be achieved by using a material between the source 16 and the copy material 14 which acts in a filtering capacity. A body of filtering material as just explained is generally indicated in Figure 2 by the block designated as 20.

Figure 3:
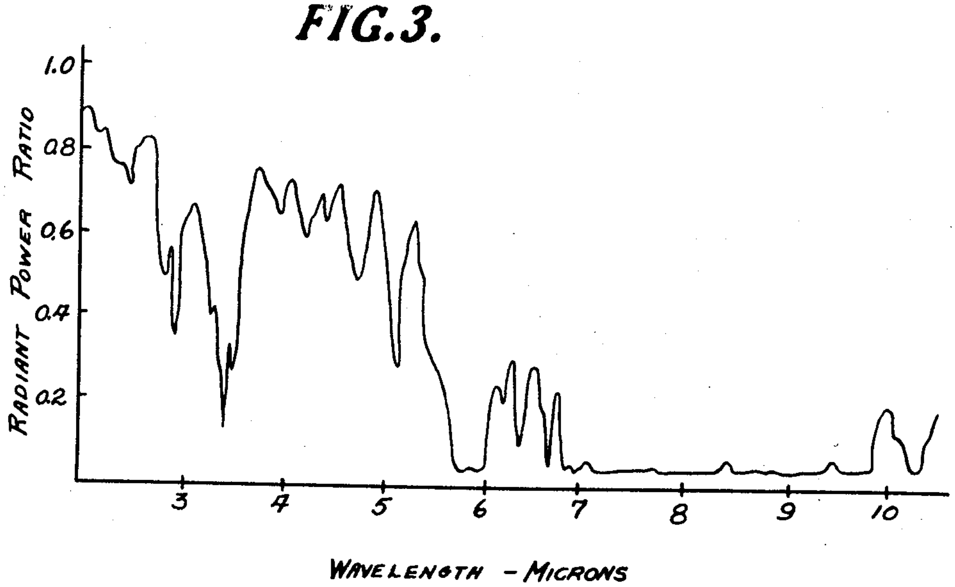
Figure 3 shows a radiant-power versus wavelength plot for one filter material according to a feature of the invention.

This material may be a true filter in the sense that it absorbs some wavelengths from the source and transmits others. Or, it may in effect "transmit" certain wavelengths and "absorb" others due to absorption in and reradiation from the material. The words "filter," "filtering," etc., are used herein to embrace both concepts. The principal interest in this case is the amount of radiation at each wavelength which appears at the side of the filter opposite the source. Figure 3 is to be interpreted as showing for each wavelength the ratio the radiant power which exists in a zone which is separated from the source by the filter to the radiant power of that wavelength which exists at the source side of the filter. As stated, the radiation beyond the filter may be due to radiation transmitted through the filter from the source, or may be radiation from the filter itself due to heat conditions therein, or both.

One of the most desirable filter materials I have found comprises a layer or sheet of Mylar polyester film which is readily available from the Du Pont Company. An equivalent product is Terylene film of Imperial Chemical Industries, London. Both Mylar and Terylene comprise polyethylene terephthalate (see Patent 2,465,319) which has been melt-extruded into film form and drawn. I believe that such polyethylene terephthalate film gives such excellent results because its transmission-absorption characteristics from one to ten microns wavelength generally demonstrates a sharp cut-off at about five and one-half microns. Figure 3 shows a typical curve for Mylar at substantially room temperature. For example, effective results are obtained with a film of this type material of about 3 mils thickness, in equipment and under techniques per this disclosure and the above cited patents, or in apparatus and with materials now and heretofore marketed by the assignee of the aforecited patents. Whatever the nature of the radiation source, this filter gives excellent results.

I have further discovered that quartz satisfies the invention. However, use of quartz in reproduction apparatus of the type which has been explained herein, if in proximity to the source of infra-reds and therefore subject to heating-up as upon continued use of the machine, seems to allow longer wavelengths to appear and the benefits of the invention are lost. The action of heat upon quartz is probably as much to cause long wavelength re-radiation therefrom as a matter of passing longer wavelengths from the source. I include it under the words "filter," etc., herein on this basis.

I have further found that a filter in the form of a sheet of paper or equivalent cellulosic material satisfies the invention: for example, a sheet of ordinary white typing paper. It appears that such material absorbs the relatively longer wavelengths as discussed hereinabove.

An infra-red emitting filament in a quartz jacket is no solution, unless steps be taken to maintain it cool, because the quartz heats up and loses its advantage. I have not experienced this difficulty using the film or layer of polyethylene terephthalate passed through copying apparatus, presumably because it does not have an opportunity to heat up and therefore its characteristics do not have an opportunity to shift due to increase in temperature.

In any case, if a particular filter when heated up has adverse transmission and/or re-radiation characteristics, then in accordance with the present invention, some step should be taken to control its temperature. Blowers, heat sinks or the like can be used.

Any device or material surrounding the radiation producing filament or other body as a source per se, or otherwise intercepting the radiation, I consider to be a filter in accordance with the use of this word herein.

Figure 4:
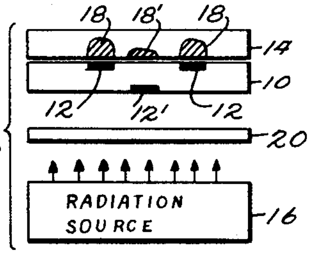
Figure 4 shows in cross-section an arrangement of original copy material, filter and radiation source according to features of the invention.

It has been indicated above that regulation of the radiations may be to filter from only the original, only the copy, or both. Therefore, the plied combination can take several forms. For example, the source of radiations 16 may be placed so that the graphic original 10 lies between the source and the copy material 14. This situation is shown in Figure 4, distinguishing from Figure 2. Where the graphic original 10 in its background areas will permit the radiations to penetrate therethrough to reach the darkened areas 12, again visible change 18 occurs. Again, the filter 20, or control of the radiation source 16, in accordance with my present discoveries, produces improved results in accordance with the foregoing explanation. It should be mentioned that the process is operative in the case of printing or the like on both sides of the graphic original. Printing on the opposite side is suggested at 12' in Figure 4. By adjustment of the power of the radiation source 16, there may be obtained visible change 18' (Fig. 4) and in this case little or no visible change 18 due to the darkened areas 12 on the upper side of the graphic original. Degradation due to the radiations from source 16 reaching the copy material 14, may be prevented by use of my filter, or my control of the radiation source.

Figure 5:
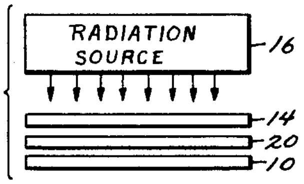
Figure 5 shows a body of filter material acting between a source of radiations and only the original material.
Figure 6:
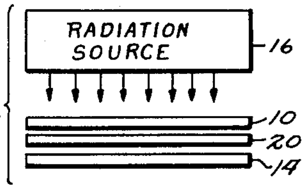
Figure 6 shows the body of filter material acting between a source and only copy material.

In Figures 2 and 4 the regulation of radiations is exercised jointly in regard to both the original and copy material. However, as indicated above, only the original may be protected from certain wavelengths, or only the copy. Figure 5 shows a representative situation where the filter 20 only protects the original 10. Figure 6 shows a representative situation where the filter 20 only protects the copy 14.

Figure 7:
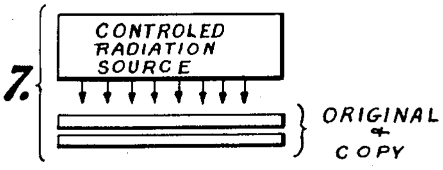
Figure 7 shows a controlled radiation source acting upon original and copy materials.

In all cases, if the source per se can be controlled, the filter material can be dispensed with. Figure 7 is intended to show this situation. Two plies of material are shown here without application of reference characters, inasmuch as the original and copy can be variously arranged in accordance with the foregoing.

The scope of my invention extends beyond the sole line of conductive-heat-responsive materials disclosed by the aforementioned patents. There are other types of materials, not conceived of by the above patents, which fall within the hereto appended claims. One different line of materials is that in which the useful change is the providing of a duplicating stencil. See Roshkind et al. Patent 2,684,628 and Hoover Patent 2,699,113. If materials of this type are placed in heat conductive contact with the graphic original 10, then the useful stencil type result is obtained. Again, my concept of controlling the radiation source, or filtering the radiations therefrom, so as to achieve optimum production of the useful change in these materials, but without degradation of the remaining areas, is a pronounced improvement and falls within the present invention.

Figure 8:
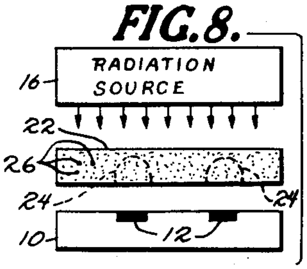
Figure 8 shows an arrangement of features according to the invention.
Figure 9:
Figure 9 shows a particular type of record according to use of the invention.

I have discovered that there is another completely different type of material, not conceived by any of the aforementioned patents nor within the scope thereof which can be handled to produce a useful change when placed in proximity to a graphic original and irradiated. The line of materials now under discussion is one where permanent light scattering centers are created within a layer. In accordance with discoveries made by myself and others associated with the assignee of the present invention, a layer of a vehicle material, for example, a gelatin, can have dispersed therein a substance which decomposes upon exposure to certain radiations. If such material, designated 22 in Figure 8, is exposed overall to the decomposing radiation and then placed in proximity to, although even out of contact with graphic original 10, and the original irradiated with preferably infrared energy from source 16, an increase in temperature within dash line areas 24 is experienced, due to the differential absorption in the graphic original 10, between the background and the darker areas 12. In this case re-radiation from the darker areas of the original is a primary cause of this temperature increase. I find that the conductice contact of copy with original, vital to the aforementioned patents and materials, is not required with the just mentioned scatter center materials. Nevertheless, regardless of basic differences, a useful result is produced within the regions 24 when irradiated with the infra-reds in that scatter centers appear. In other areas, the light scattering centers do not develop. A result is thus achieved as shown in Figure 9 where the regions of light scattering centers 28 now exist, but in the remaining areas there has been no visible change. It will be understood that the decomposing substance both before and after exposure to its decomposing radiation, nevertheless is substantially invisible.

It will be appreciated that the materials explained in the immediately preceding paragraphs are primarily radiation sensitive materials, rather than conductive-heat sensitive. In other words, the materials are basically photographic rather than thermographic.

Particular types of scatter center materials and methods of making and using same are described and claimed in copending applications.

With these scatter center type materials, I find that without regulation of the copying irradiation in accordance with this invention, serious degradation occurs. However, as an example, when irradiating with infra-reds generally between one and ten microns wavelengths, and by techniques and in apparatus in accordance with this disclosure and the aforenoted patents, very excellent results are obtained using a Mylar type filter.

It should be understood that the various components can be rearranged from Figure 8 to the style of Figures 4, 5 and 6 and any other possible combination; that is, the original and copy can be both protected, or one or the other.

It has been previously explained that the filter 20 can be in a variety of forms. It can be a layer of quartz or the like between the radiation source and the copy material, a film of Mylar or Terylene polyester, or whatever other material provides the correct radiation regulating characteristics for the particular original and copy materials which are employed. Instead of the filter being a permanent piece of material built into the apparatus, it can be a permanent part of the copy material, or it can be a further sheet of material inserted into the apparatus together with the plied combination of the copy material and the original. For example, as shown in Figure 10, if the reproduction apparatus is a so-called flat bed type machine characterized by a transparent plate 30 upon which may be placed the copy material here designated 32 (which may be any of the above mentioned types) and the graphic original 10 thereabove with a line source of light 16' caused by a suitable mechanism to move transversely beneath the plate 30 to irradiate therethrough with infra-reds, the filter 20 may be simply a sheet of Mylar or the like to intercept the infra-reds from the source 16' to prevent same from reaching the copy material 32. The plate 30 itself may be of the filter material. It will be understood that the plies 10, 20 and 32 in Figure 10 can be rearranged in accordance with the various inversions hereinabove described.

Still referring to Figure 10 it is apparent that the filter material 20 can be permanently attached to or built into the plate 30, or a separable sheet 20 can be inserted with each original-copy combination. A separable filter may be the best practice if a selected permanent filter may heat up if the machine is used for considerable periods of time, and this heat cause undesirable shift in the radiation regulating characteristics.

The apparatus may be such as shown in Figure 11, of a type where a continuously travelling flexible belt 40 driven by motor 41 passes about a rotating cylinder 42 so as to pass in proximity to an infra-red (or other suitable) source 44. In this type of apparatus the combination of at least the graphic original 10 and the copy material, again generically 32, may be sandwiched between the drum 42 and the belt 40 so that as it passes the position of the source 44 radiations to which the belt 40 is transparent will perform the copying operation. Obviously, there are many equivalent varieties of this apparatus. The source could be within drum 42. Filtering of the radiations from source 44 in accordance with the principles of my present invention can be achieved in several ways. First, a filter designated 20' of suitable material in accordance with the foregoing, could be permanently mounted in the apparatus. However, if the selected material shifts its radiation regulating character upon increase in temperature, arrangements should be made for maintaining it cool. For example, a blower 46 could be employed here, as well as in all other types of apparatus. Or, suitable heat sinks (not shown) can be relied upon. Many other arrangements will occur to workers in the art, and no limitation is intended.

Second, the belt 40 may itself be made of the proper filtering material, or the drum 42 or the jacket of the source, etc., be of the filter material, cooled as necessary. For example, the belt or drum could be of Mylar. Third, a separate sheet of suitable filtering material here designated 20'' can be inserted as part of the plied combination otherwise comprised of the graphic original and the copy material. Fourth, the copy material can have suitable filtering material as an integral part thereof. Many other obvious aspects will occur to those reading the present disclosure. Again, the sequence of the graphic original, the copy material and the filter material can be interchanged as has been explained hereinabove.

By use of the present invention greatly enhanced results are obtained. Heretofore lack of knowledge of proper regulation of the irradiations has caused even the most experienced of operating personnel to waste a great deal of time and copy material trying to arrive at proper settings of apparatus involved. Continued use of marketed apparatus has required readjustment from time to time, and if the operator is not highly skilled in anticipating such changes copy material is wasted. In many cases it becomes impossible to adjust the apparatus to avoid degradation. By the present disclosure great leeway is possible in lamp settings, machine speeds, etc., but with consistently good copies from widely divergent types of originals.

The foregoing is given for purposes of illustration, and the true scope of the invention is to be determined by the appended claims.

What is claimed is:

1. In apparatus including a source of irradiating radiations and means for receiving copy material and graphic original material and so that the copy material and graphic original are in such position relative to one another and to the source that the differential absorption of radiation in the graphic original between areas of greater and lesser absorption produces a useful change in the copy material in areas thereof corresponding to areas of relatively greater absorption of said radiations in the original; the improvement which comprises a layer of polyethylene terephthalate positioned to intercept radiations to one or both of said materials.

2. In apparatus including a source of irradiating radiations and means for receiving copy material and graphic original material and so that the copy material and graphic original are in such position relative to one another and to the source that the differential absorption of radiation in the graphic original between areas of greater and lesser absorption produces a useful change in the copy material in areas thereof corresponding to areas of relatively greater absorption of said radiations in the original; a means for regulating the radiations reaching at least one of the materials so that relatively longer wavelength ranges to which said one material itself is responsive to produce an undesired change in the copy material during operation do not reach said one material in appreciable strength while adjacent ranges reach the original in strength sufficient to cause the copy material to undergo a useful change only in areas corresponding to areas of greater absorption in the original due to absorption of radiation therein, the aforesaid means for regulating the radiations comprising a body of polyethylene terephthalate positioned between the source of radiations and at least one of said materials.

References Cited in the file of this patent

UNITED STATES PATENTS

| | | |
|---|---|---|
| 2,740,895 | Miller | Apr. 3, 1956 |
| 2,740,896 | Miller | Apr. 3, 1956 |